United States Patent [19]

Mukasa et al.

[11] Patent Number: 4,592,963
[45] Date of Patent: Jun. 3, 1986

[54] THIN-FILM MAGNETIC HEAD AND COMPOSITE MATERIAL SUBSTRATE THEREFOR

[75] Inventors: Koichi Mukasa; Takashi Hatanai, both of Nigata; Keishi Nakashima, Yunotani; Kazumasa Onishi, Nigata, all of Japan

[73] Assignee: Alps Electric Co., Ltd., Japan

[21] Appl. No.: 661,067

[22] Filed: Oct. 15, 1984

Related U.S. Application Data

[63] Continuation-in-part of Ser. No. 513,230, Jul. 13, 1983, abandoned.

[51] Int. Cl.⁴ .............................................. G11B 5/28
[52] U.S. Cl. .................................. 428/544; 428/545; 428/626; 428/928; 360/122
[58] Field of Search ............... 428/544, 545, 626, 928; 360/122

[56] References Cited

U.S. PATENT DOCUMENTS

| | | | |
|---|---|---|---|
| 3,705,450 | 12/1972 | Morisaki | 428/545 |
| 4,092,688 | 5/1978 | Nomura et al. | 360/121 |
| 4,127,884 | 11/1978 | Nouchi et al. | 360/119 |

FOREIGN PATENT DOCUMENTS

| | | | |
|---|---|---|---|
| 57-14078 | 3/1982 | Japan | 428/545 |
| 57-138037 | 8/1982 | Japan | 428/626 |

Primary Examiner—Veronica O'Keefe
Attorney, Agent, or Firm—Guy W. Shoup

[57] ABSTRACT

A composite material for use in the preparation of substrates for thin film magnetic heads is provided which comprises a carbonaceous or graphitic material strengthened with a resin or metallic binder and optionally impregnated with a resin, metallic or non-metallic impregnant.

22 Claims, 1 Drawing Figure

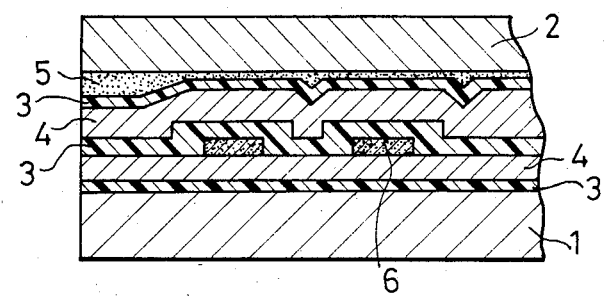

THIN-FILM MAGNETIC HEAD AND COMPOSITE MATERIAL SUBSTRATE THEREFOR

RELATED APPLICATIONS

This application is a continuation-in-part application of our earlier filed, copending application Ser. No. 513,230 filed July 13, 1983, now abandoned.

FIELD OF THE INVENTION

The present invention relates to thin film magnetic heads normally comprising a substrate, an insulating layer, a magnetic layer, a coil layer, and possibly other layers. More specifically, the invention relates to improved substrates employed for the preparation of such magnetic heads.

BACKGROUND OF THE INVENTION

Thin film magnetic heads are well known and widely employed in the art of visual and sound reproduction.

A typical thin film magnetic head is illustrated in the drawing in which 1 is a substrate, 2 a protective layer, 3 represents each of three separate insulation layers, 4 a magnetic layer, 5 an adhesive layer and 6 a coil layer.

For maximum efficiency, the substrate layer should have high abrasion resistance and good lubricity. For optimum mechanical strength the coefficient of thermal expansion of the substrate and the magnetic layer should be approximately equal. Moreover, since an electric current is passed through the thin film magnetic heads, there must be good thermal conductivity so that the magnetic characteristics of the head are not affected by changes in temperature.

A wide variety of known materials are now employed in the preparation of magnetic heads. For example ferrite with a thermal expansion of $1 \times 10^{-5}/°C$. is often utilized in the preparation of substrates because of its good abrasion resistance. Other materials employed in the preparation of substrates include ceramic glass (coefficient of thermal expansion: $1 \times 10^{-5}/°C$., thermal conductivity: 2 k cal/m.hr.°C.), and silicone (coefficient of thermal expansion: $5 \times 10^{-2}/°C$., thermal conductivity —60 k cal/m. hr. °C.). There are no known materials which are totally satisfactory for the preparation of substrates taking into consideration all properties which would be desirable in substrate components. As a result, substrates are presently prepared utilizing materials representing compromises between what the art wishes to achieve and what can actually be achieved.

SUMMARY OF THE INVENTION

A principal object of this invention is to provide composite materials for use in the preparation of substrates for thin film magnetic heads which are superior in abrasion resistance, lubririty and thermal conductivity while at the same time having coefficients of thermal expansion as close as possible to the same coefficients of the materials utilized in the preparation of the magnetic layer.

Another is to provide improved substrates for the preparation of thin film magnetic heads.

These and other objects have been achieved in accordance with this invention by providing composite materials and substrates consisting essentially of carbonaceous materials together with selected binders to improve mechanical strength. In preferred aspects of the inventions, the mechanical strength of the substrate is remarkably improved by the use of selected impregnants.

The substrates provided by this invention are used to provide improved thin film magnetic heads comprising at least the substrate, an insulative layer, a coil layer and a magnetic layer.

BRIEF DESCRIPTION OF THE DRAWING

The FIGURE is an enlarged cross sectional view of a thin film magnetic head of the structure described above.

DETAILED DESCRIPTION OF THE INVENTION

This invention provides substrates for use in the preparation of thin film magnetic heads wherein the substrate generally consists of carbon in the carbonaceous or graphitic phase and a carrier which may be impregnated.

The term "carbonaceous" as is known in the art refers to a predominantly carbon material in a phase between amorphous and crystalline. Graphitic refers to a fixed crystalline allotropic form of carbon. The two phases may be separate or coexist in mixtures. The separate phases and mixtures thereof are useful in this invention.

Carbonaceous and graphitic materials which may be used in this invention include, for example, natural graphite, synthetic graphite, coal coke, oil coke, carbon black and coal powder.

These materials have excellent self-lubricity, but are defficient is mechanical strength. Binders are employed to improve the mechanical strength. Typically useful binders include pitch and metallic binders.

Resinous binders, particularly thermosetting resinous binders such as furan-formaldehyde and epoxy resins are useful, as are thermoplastic resins such as fluorinated hydrocarbons, and polyacetals. It will be apparent to those skilled in the art that the mentioned resins are exemplary only. Many other resins can be employed. These resinous binders can be converted into graphite or a carbonaceous materials by heat treating in an inert atmosphere after completion of the bonding.

Metalic binders may also be employed. These include iron, manganese, chromium, cobalt titanium, molybdenum, tungsten, etc, and alloys of such metals.

The carbonaceous material, or graphite and the binders are mixed to contain from about 50 to 70 wt % binder and 30 to 50 wt % carbonaceous material or graphite by weight based on the total weight.

The mixture may be press molded and sintered either successively or concurrently.

The products, after sintering, sometimes are formed with fine voids on the surface. The products retain their utility even with fine voids, but the mechanical strength can be improved by filling the voids with an impregnant. The use of am impregnant simultaneously improves the mechanical strength and the surface smoothness of the products.

Substantially the same resins and metals may be used as impregnants as are used as binders. The resins for example, include phenol-formaldehyde resins, furan-formaldehyde resins, flourinated hydrocarbons, polyamides such as the nylons, and polyolefins, particularly polyethylene and polypropylene. Metals include tin, antimony, copper, zinc, silver, lead, aluminum, magnesium, cadmium, etc., and their alloys with melting points below that of the binder. Impregnation is conducted by standard procedures at temperatures about 50° C. to 100° C. above the melting point of the material being impregnated. Generally it is preferred that the difference in melting points between the two materials be at least 150° C.

Non-metallic impregnants, particularly glasses such as borosilicate, silicic acid, silicate-alkuli, lead alkali, soda lime, and potassium calcium and barium containing glasses are useful.

The preferred substrates of this invention are prepared utilizing metallic binders and improvements. They are preferred because they are relatively easy to prepare and give good results.

Generally, if the carbonaceous material content is less than about 50% by volume, lubricity is unsatisfactory. If it is about 95% by volume there is a loss in mechanical strength. The loss of mechanical strength due to sliding contact is increased, as a result of which the magnetic media are damaged.

By appropriately selecting the components of the substrates of this invention and the relative amounts of each component the coefficient of thermal expansion of the substrate can be adjusted so that it is substantially equivalent to that of the magnetic layer, and the thermal conductivity can be increased to as high as 20-200 Kcal/m.hr. Thermal conductivity at this level makes it possible markedly to increase the amount of current which can be passed through a thim film magnetic head.

A typical substrate of this invention with a coefficient of thermal expansion of about $8 \times 10^{-6}$/°C. contains 70 wt % carbonaceous carbon and 30 wt % of an Al-Si alloy in the weight ratio of 87:13.

Superior thin film magnetic heads can be produced if both the substrate 1 and the protective plate 2 are formed from the composite material of this invention. With such products, using an open tape the abrasion is 0.1 mm or less per 10,000 km running length. With magnetic tape cassettes, abrasion is 0.2 cm or less even at running times of 100 hours or more.

The following non-limiting examples are given by way of illustration only.

EXAMPLE 1

A composition containing 100 grams of powdered coke with a particle size less than 45 μm as a carbonaceous material and 30 grams of pitch, as a binder, was thoroughly mixed and pressed in a press mold a a pressure of 2 ton/cm² to form a substrate. The substrate was sintered at 1100° C. in a nitrogen atmosphere and then autoclaved. The pressure in the autoclave was then reduced to 10 mm Hg for one hour to evacuate the gas from the sintered substrate. It was then impregnated with a mixture of 50% antimony and 50% tin under argon pressure of 50 kg/cm² at 850° C. The resulting substrate contained, by volume based on the total volume, 85% carbonaceous material and 15% metallic impregnant. The bulk specific gravity was 2.7 gm/cm³.

EXAMPLE 2

Example 1 was repeated, at the same temperatures, pressures and times, except that the antimony-tin impregnant was replaced with a divinylbenzene. The product produced contained 85% by volume carbonaceous material and 15% by volume resin.

EXAMPLE 3

A composition containing 70% by volume powdered graphite (up to 325 mesh) and 30% by volume powdered copper (up to 325 mesh) was thoroughly mixed and pressed at a temperature of 1150° C. and a pressure of 1 ton/cm² to produce a substrate of high packing density and dense structure.

EXAMPLE 4

Example 1 was repeated except that the antimony-tin impregnant was replaced with borosilicate glass to produce a substrate containing 80% by volume carbonaceous material and 20% by volume impregnant.

EXAMPLE 5

A composition containing 100 grams of powdered coal pitch coke with a particle size of up to 70 cm and 100 grams of powdered copper with a particle size of up to 5 μm was thoroughly mixed and hot pressed at 1150° and 1 ton/cm² to produce a substrate. The substrate was held in an autoclave at 10 mmHg for 1 hour to remove the gases. The substrate was impregnated with molten polytetrafluoroethylene at a reduced pressure of about 10 mmHg. The carbonaceous material content of the resulting product was about 60% by volume.

The substrates produced as described in the examples can be converted to operative magnetic heads by standard production techniques well known in the art. Since these techniques from no part of this invention, they are not described here.

Thin film magnetic heads produced from the substrates of this invention are superior to known products in such important characteristics as abrasion resistance, lubricity, thermal conductivity, and coefficient of thermal expansion. Typically, products of the invention will manifest the following characteristics:
Coefficient of friction: 0.1 to 0.25.
Thermal conductivity: 100 to 300 BTU.
Thermal expansions coefficient: 20 to 100 ($10^{-6}$/°C.).

What is claimed is:

1. A composite material for use in the preparation of a substrate for thin film magnetic heads consisting essentially of about 50 to 95% by volume carbonaceous or graphitic carbon or mixtures of these together with about 5 to 50% of a binder.

2. A substrate for use in the preparation of thin film magnetic heads comprising a composite material of claim 1.

3. A substrate of claim 2 wherein the carbonaceous or graphitic material is selected from a group consisting of natural graphite, synthetic graphite, coal coke, oil coke, carbon black, and coal powder.

4. A substrate of claim 3 wherein the binder is a thermosetting or thermoplastic resin.

5. A substrate of claim 3 wherein the binder is a metal.

6. A substrate of claim 5 wherein the metal is iron, manganese, chromium, cobalt, titanium, molybdenum, tungsten or an alloy thereof.

7. A substrate of claim 4 impregnated with a resin.

8. A substrate of claim 7 wherein the resin is a phenol formaldehyde resin, a divinylbenzene resin, a furan-formaldehyde resin, a fluorinated hydrocarbon resin, a polyethylene resin, a polypropylene resin or a polymide resin.

9. A substrate of claim 4 impregnated with a metal.

10. A substrate of claim 9 wherein the metal is tin, antimmy, copper, zinc, silver, lead, aluminum, magnesium or an alloy thereof.

11. A substrate of claim 5 impregnated with a resin.

12. A substate of claim 11 wherein the resin is a phenolformaldehyde resin, a divinylbenzene resin, a furan-formaldehyde resin, a flourinated hydrocarbon resin, a polyethylene resin, a polypropylene resin or a polyamide resin.

13. A substrate of claim 5 impregnated with a metal.

14. A substrate of claim 13 wherein the metal is tin, antimony, copper, zinc, silver, lead, aluminum, magnesium or an alloy thereof.

15. A substrate of claim 4 impregnated with a non-metallic inorganic compound.

16. A substate of claim 15 wherein the non-metallic compound is a glass.

17. A substrate of claim 16 wherein the glass is a borosilicate, silicic acid, silicate-alkali, lead alkali, soda lime or potassium, calcium or barium containing glass.

18. A substrate of claim 5 impregnated with a non-metallic inorganic compound.

19. A sustrate of claim 18 wherein the non-metallic compound is a glass.

20. A substrate of claim 19 wherein the glass is a borosilicate, silicic acid, silicate-alkali, lead alkali, soda lime or potassium, calcium or barium containing glass.

21. A substrate of claim 2 wherein the binder is a metal, and the impregnant is a metal with a melting point lower than the melting point of the metallic binder.

22. A thin film magnetic head for sliding contact with a magnetic surface comprising a substrate made of a composite material according to claim 1.

* * * * *